United States Patent [19]

Fawcett

[11] Patent Number: 5,584,457
[45] Date of Patent: Dec. 17, 1996

[54] CLAMPING SUPPORT FOR REMOVABLE ATTACHMENTS

[76] Inventor: Bliss Fawcett, 130 - 6th Avenue East, Qualicum, British Columbia, V9K 1R2, Canada

[21] Appl. No.: 318,290

[22] Filed: Oct. 5, 1994

[51] Int. Cl.⁶ .................................................. A47B 96/06
[52] U.S. Cl. ...................... 248/229.1; 362/396; 362/802; 248/229.14; 248/316.4
[58] Field of Search .................. 248/225.31, 231.3, 248/231.4, 316.4, 316.2, 688, 291, 122; 362/396, 410, 431, 802, 276

[56] References Cited

U.S. PATENT DOCUMENTS

| | | | |
|---|---|---|---|
| 799,453 | 1/1905 | White | 362/396 |
| 1,136,005 | 4/1915 | Gumbel | 362/432 |
| 1,266,367 | 5/1918 | Wilson | 248/118 |
| 1,363,664 | 12/1920 | Livingston | 362/396 |
| 1,367,369 | 2/1921 | Friend | 362/396 |
| 1,470,706 | 10/1923 | Day | 362/396 |
| 1,483,355 | 2/1924 | Kupsche | 362/413 |
| 1,717,948 | 6/1929 | Stokes | 362/396 |
| 2,371,903 | 3/1945 | Maier | 248/231.4 |
| 2,998,476 | 8/1961 | Nix | 248/231.4 |
| 3,851,166 | 11/1974 | Kohler | 362/396 |
| 4,286,309 | 8/1981 | Rasinski | 362/396 |
| 4,376,965 | 3/1983 | Bacevius | 362/396 |
| 5,180,220 | 1/1993 | Van Kalsbeek | 362/98 |

FOREIGN PATENT DOCUMENTS

| | | | |
|---|---|---|---|
| 632302 | 11/1949 | United Kingdom | 362/396 |
| 2220767 | 1/1990 | United Kingdom | 248/225.31 |

Primary Examiner—Karen J. Chotkowski
Assistant Examiner—Anita M. King
Attorney, Agent, or Firm—Myers, Liniak & Berenato

[57] ABSTRACT

A clamping device which includes an elongate element, a fixed jaw coupled to the elongate element, a movable jaw slidable along the elongate element, and a clamping mechanism coupled to the movable jaw operative to move the movable jaw towards the fixed jaw slightly while being clamped to the elongate element.

18 Claims, 4 Drawing Sheets

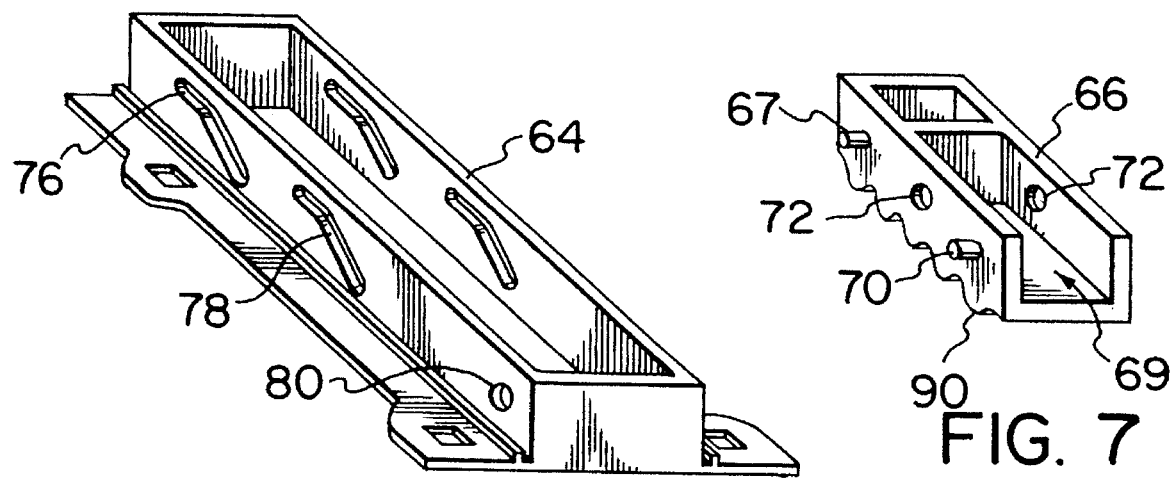
FIG. 6
FIG. 7
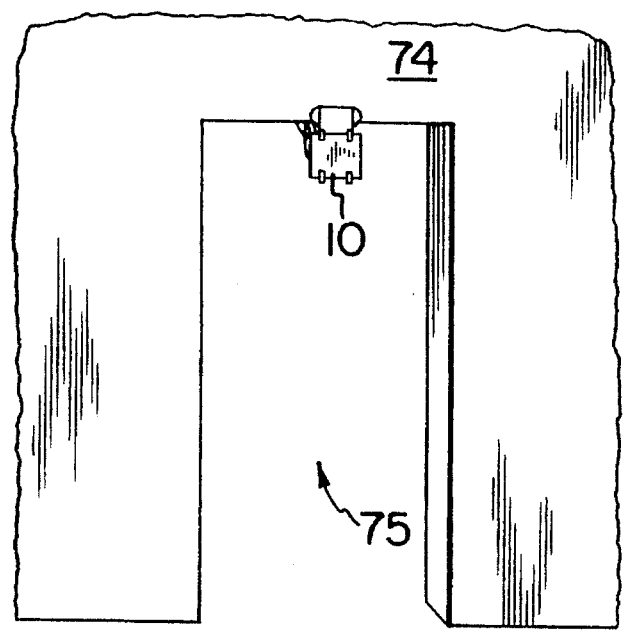
FIG. 8

CLAMPING SUPPORT FOR REMOVABLE ATTACHMENTS

FIELD

The present invention relates to a clamping support for removable attachments for use in locating on a temporary or permanent basis a desired attachment, such as a flood light, proximate an area where the attachment is needed.

BACKGROUND

There exist various attachments providing services needed to areas where there are no such services such as extension cords, power bars and lamps having clips which allow them to be clipped onto a board or other similar rigid support. However, if one requires a light with intense illumination, a motion detector or a speaker to be positioned at a desired location, special mounting and powering arrangements are required. For example in the early stages of construction of a house, a light is often needed where there are none yet installed. If wallboard has been applied the only places available for supporting a light assembly are the floor, a step ladder or a nail in the wall. However, such installations often cannot be located where they are the most convenient, are sometimes time consuming to prepare and are often cumbersome to change.

Accordingly, there is provided a support for a removable attachment which can be easily installed at a desired location and can be used for as a universal clamping device for a host of different purposes.

SUMMARY OF THE INVENTION

According to the invention there is provided in a clamping device, a combination which includes an elongate element, a fixed jaw coupled to the elongate element, a movable jaw slidable along said elongate element, and a clamping mechanism coupled to the movable jaw operative to move the movable jaw towards the fixed jaw slightly while being clamped.

The elongate element may have a track and the clamping mechanism may include an insert slidable along the track and coupled to the movable jaw. A movable rack positioned in the insert may be removably engageable with the track. A lever may be coupled to the insert and to the movable rack so as to move the movable rack into and out of engagement with the track.

The track may have a plurality of transverse ribs and a track engaging surface of the movable rack may have a plurality of transverse ribs which mate with those of the track.

Advantageously, a head assembly having an attachment receiving means may be coupled to the track and an service attachment coupled to the attachment receiving means.

A stand may be included which has a pair of legs and a jaw receiving portion so that, when clamped between the jaws, orients the track and head assembly so that the attachment is above an opposite end of the track.

Advantageously, the track is capable of flexing as the movable jaw is tightened against the fixed jaw.

The ease with which the pair of jaws may engage and clamp onto a wall, beam or other surface make the device fast inexpensive and convenient device to use and provides means for attaching such units as a flood lamp, a power bar, a motion detector, a stereo speaker or other such attachment.

The movement of the movable jaw towards the fixed one while the movable jaw is being clamped ensures a secure clamping engagement. The ability of the track to flex while the jaws are being clamped assists in the clamping action.

BRIEF DESCRIPTION OF THE DRAWINGS

The invention may be best understood by reference to the detailed description which follows, in conjunction with the accompanying drawings, wherein:

FIG. 6 is a perspective view of a slide;

FIG. 7 is a moveable rack which fits into the slide;

FIG. 8 is a perspective view of the clamping support clamped to the upper region of a door way;

DETAILED DESCRIPTION WITH REFERENCE TO THE DRAWINGS

Figure 1:
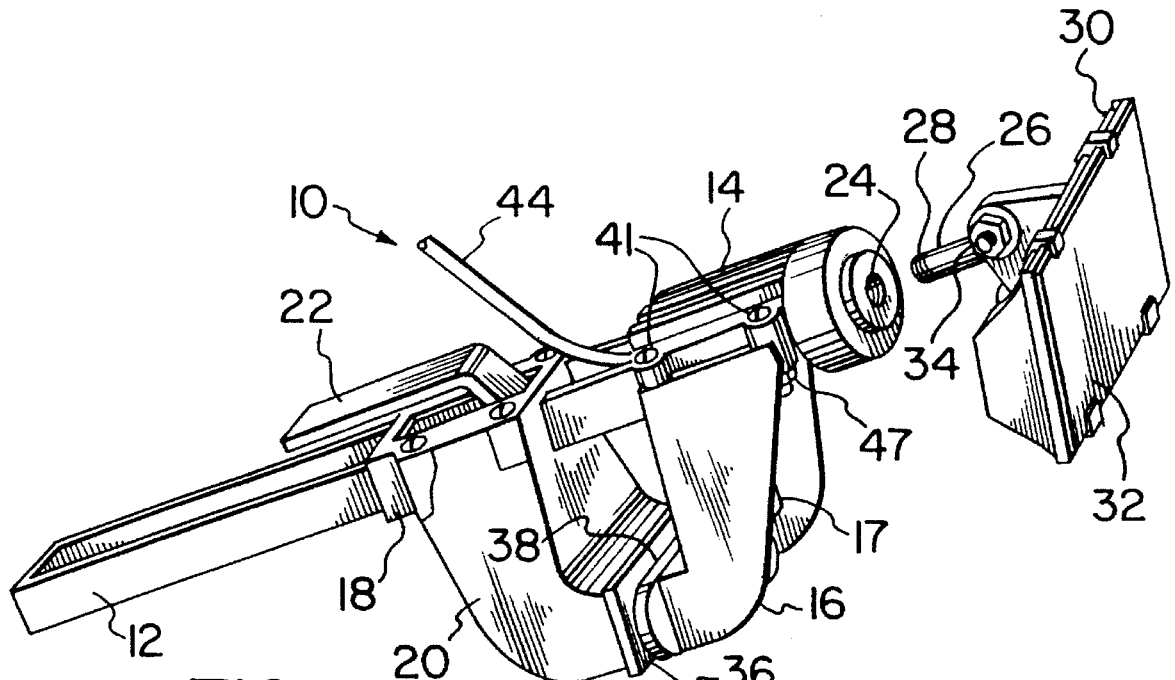
FIG. 1 is a perspective view of the clamping support for a removable attachment.

Referring to FIG. 1 the clamping support 10 has an elongated rectangular support bar 12 open along one elongated face and having a plurality of regularly spaced apart transverse tracks 62 (see FIG. 5) along the inside of a closed face thereof. At one end of the bar there is a fixed jaw assembly 17 with a fixed jaw 16 having a jaw face 38. Adjacent the fixed jaw 16 there is also affixed to the elongated bar 12 a head assembly 14 shown in detail in FIG. 4. At the forward end of the head assembly 14 is a receptacle 24. Next to the fixed jaw assembly 17 there is a sliding jaw assembly 18 having a jaw 20 and jaw face 36 which opposes face 38. Assembly 18 has a lever 22 which releases and locks the sliding jaw assembly as will be described later. A service attachment, in this case a halogen flood light attachment 30 having a glass plate 32 clipped in place over the halogen filament has a universal joint comprised of pin joint 34 and hollow pin 26 having a threaded end 28. Hollow pin 26 fits into receptacle 24 and is bolted in place in the interior as will be described later, allowing the hollow pin 26 to rotate. An electrical cable 44 passes through head assembly 14 where it connects to a switch 46 (see FIG. 4) and then runs out through receptacle 24 through the hollow pin 26 into flood light attachment 30.

Figure 2:
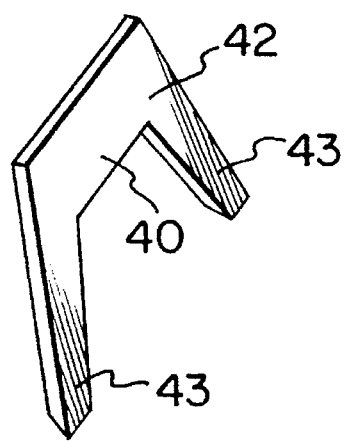
FIG. 2 is a perspective view of a stand which supports the head end of the support at an upward inclination from a floor or the ground.

Referring to FIG. 2 there is shown an adapter plate 42 having legs 43 and a jaw engaging region 40 which fits between jaw faces 36 and 38 and elevates the head assembly 14 so as to point the clamping support 10 upwardly from a floor or other horizontal support surface.

Figure 3:
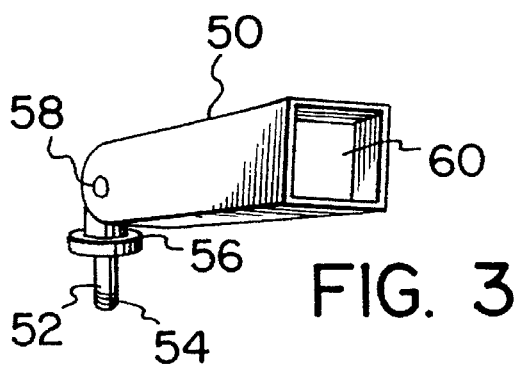
FIG. 3 is a perspective view of motion sensor adapted for use With the clamping support.

Although FIG. 1 shows a flood light attachment 30 having a hollow threaded pin 26 insertable into receptacle 24, in practice almost any type of unit could be attached as long as it has a threaded pin like hollow pin 26. For example one could attach the motion detector 50 shown in FIG. 3. The detector 50 has a sensor 60, a first pin 58 about which detector 50 rotates and a second swivel joint 56 having a rotational axis perpendicular to pin 58. Pin 52 has a threaded end 54 identical to that of hollow pin 26 in FIG. 1.

Figure 4:
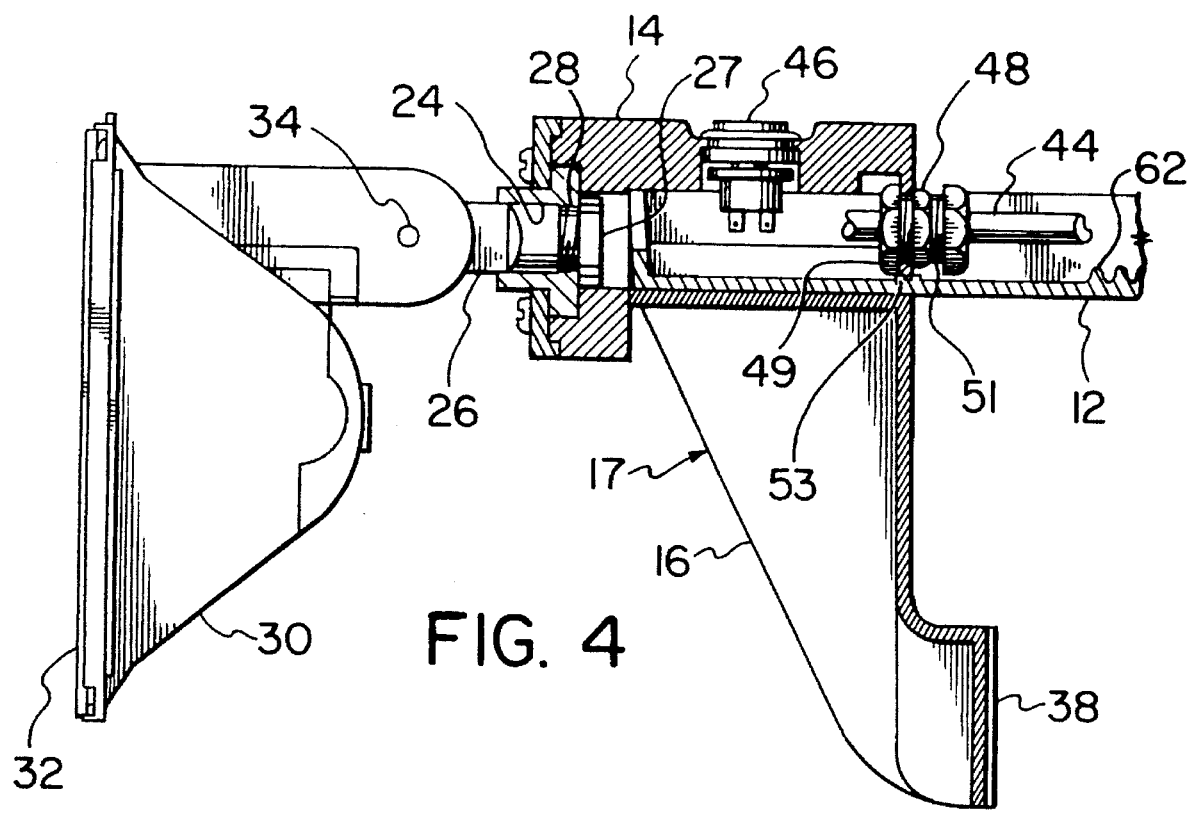
FIG. 4 is a side elevation view partially in section of the head end of the clamping support.

Referring to FIG. 4 there is shown in cross section a head assembly 14 and fixed jaw assembly 17. The flood light attachment 30 is attached to head assembly 14 by passing threaded hollow pin 26 through pin receptacle 24 into the interior of the head assembly 14 where a nut 27 engages the threads of threaded end 28 and holds hollow pin 26 from pulling out. At the same time, the connection permits rotation of hollow pin 26. Elongated bar 12 passes through the interior of and is held in place by the assemblage of parts comprising head assembly 14 which are held in place by bolts 41 (see FIG. 1) tightened against associated nuts 47. Hollow threaded tube 51 has a threaded portion passing through head assembly 14 which is captured by nuts 48 and 49. Slot 53 receives and engages a downwardly depending portion of head assembly 14. At the bottom of elongated bar 12 on the interior surface thereof begins a track 62 of regularly spaced transverse ribs. An electrical cable 44 having individual wires, one of which is in series with switch 46, passes through the interior of head assembly 14 through hollow pin 26 and into the interior of the flood light attachment 30. Cable 44 also carries a pair of communication lines to accommodate other types of attachments such as a speaker, an alarm, a satellite dish or the like.

Figure 5:
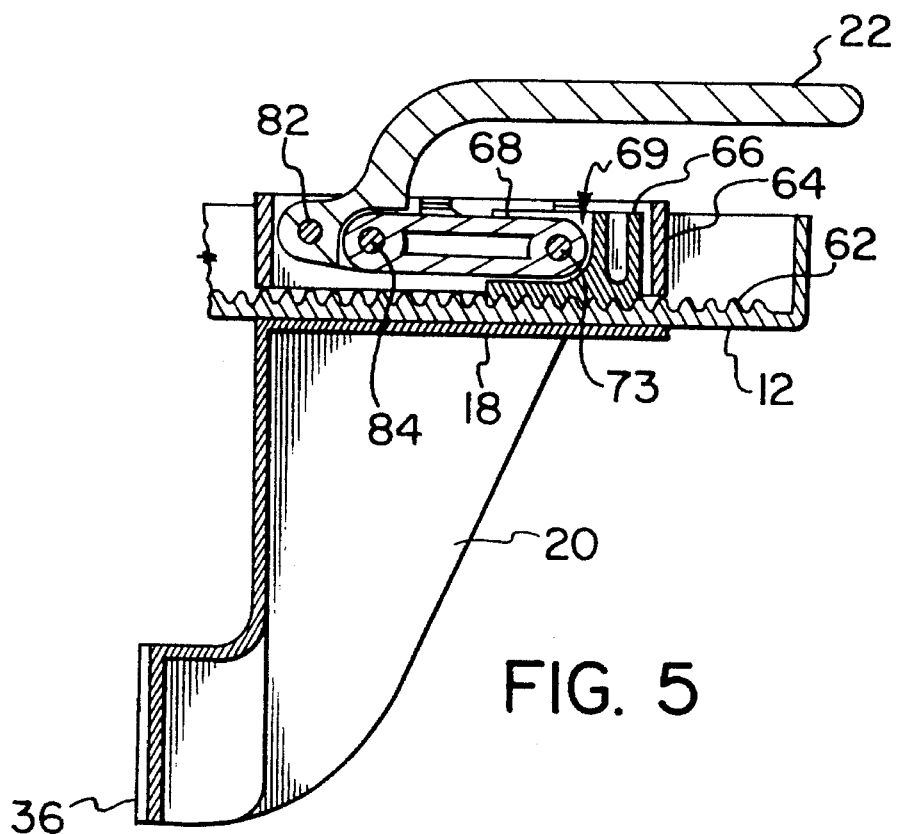
FIG. 5 is side elevation view in section of the movable clamping jaw.
Figure 10:
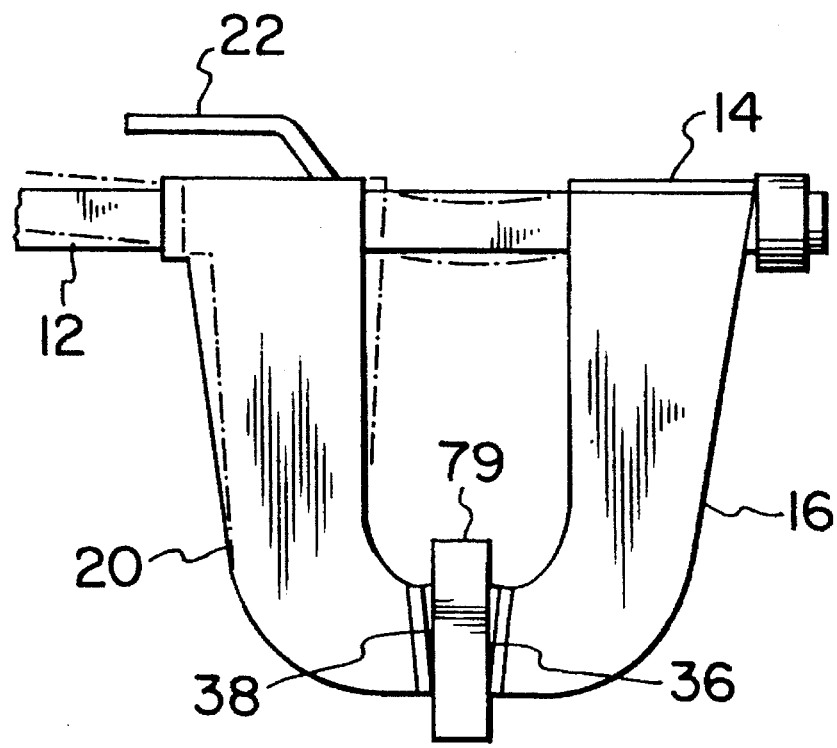
FIG. 10 a side elevation view as in FIG. 9 showing the effect of clamping the jaws against an object.

Referring to FIG. 5 the sliding jaw assembly 18 has a sliding jaw 20 with a jaw face 36 slidably mounted on elongated bar 12. An insert 64 having an open bottom is mounted on top of track 62. As seen in FIG. 6, insert 64 has a flange on either side which is connected to sliding jaw assembly 18. Inside insert 64 there is located a movable rack 66 having a rack engaging set of transverse ribs 90 shown in FIG. 7 which mate with the ribs of track 62. A lever 22 pivotally journalled to insert 64 by pin 82 is also coupled to connecting arm 68. Connecting arm 68 is also coupled by pin 73 to movable rack 66 within open cavity 69 in rack 66. As shown in FIGS. 6 and 7 movable rack 66 has pairs of pins 67 and 70 extending transversely on each side, a pair of holes 72 aligned transversely and an open cavity 69. Pins 67 and 70 fit through guide slots 76 and 78 in insert 64 and cause the movable rack 66 to execute and inclined path into an out of engagement with the track 62 and, once engaged, to execute a short path along the length of track 62 causing sliding jaw 20 to move toward fixed jaw 16. This slight closing of the jaws 16 and 20 causes the jaws to tighten slightly as the clamp is being closed. As seen in FIG. 10 elongated bar 12 flexes slightly to accomodate this movement.

Insert 64 also has a pair of transversely aligned holes 80 at one end which receive pin 82 that pivotally attaches lever 22 to insert 64. Thus, as lever 22 is moved away from elongated bar 12, pin 84 is rotated counterclockwise about pin 82 until pin 73 beings to be pulled toward pin 82. Pins 67 and 70 are constrained to travel parallel to track 62 while in the portion of slots 76 and 78 which are parallel to track 62. This causes sliding jaw 20 to move away from fixed jaw 16. Once the pins 67 and 70 reach the end of the aforesaid portion of slots 76 and 78 they travel in an inclined direction away from track 62 while movable rack 66 disengages from track 62. Once fully disengaged insert 64 and attached sliding jaw assembly 18 slide freely over elongated bar 12.

Figure 9:
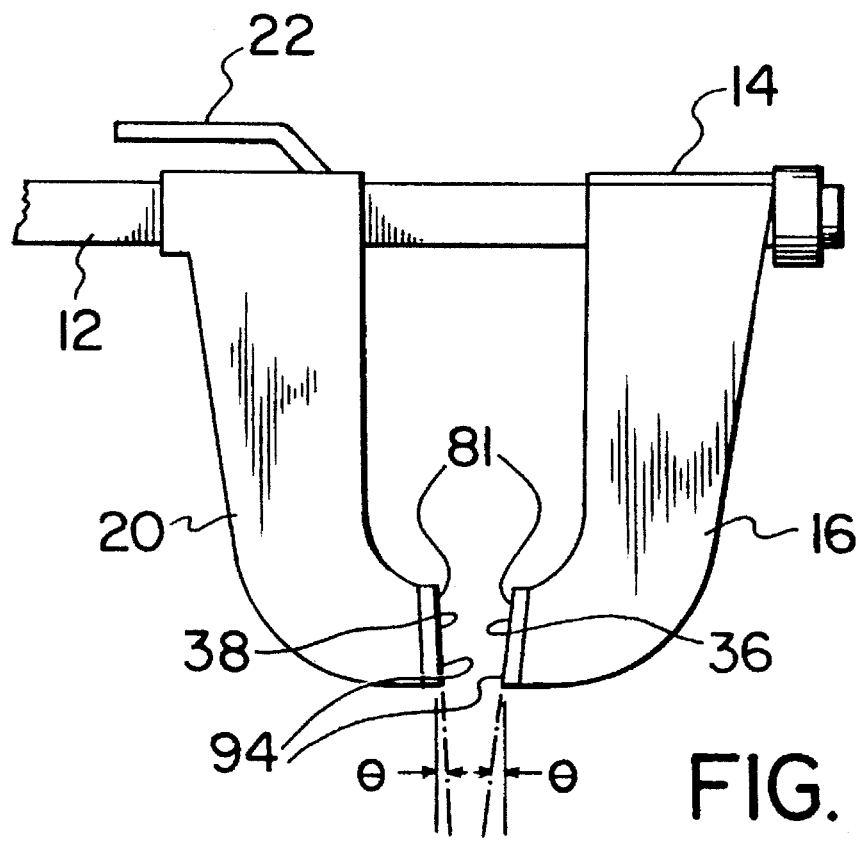
FIG. 9 is a side elevation view of a portion of the clamping support showing the jaws.

In operation the clamping support 10 can be positioned above a doorway as shown in FIG. 8 so that its jaws 16 and 20 engage the walls 74 near the open doorway 75. Lever 22 is moved away from elongated bar 12 and jaws 16 and 20 are caused to be opened to engage walls 74. Sliding jaw 20 is then slid toward jaw 16 until jaw faces 36 and 38 engage walls 74. As can be seen in FIG. 9, faces 36 and 38 are inclined so as to converge along a line outwardly of elongated bar 12. Thus, as lever 22 is pressed toward elongated bar 12, regions 94 first contact the object and further tightening causes elongated bar 12 to bow as regions 81 approach each other until faces 36 and 38 contact the object along the whole of their surfaces. This bowing effect is shown by the dotted lines in FIG. 10 in which elongated bar 12 bends in the region between the jaws 16 and 20 and the jaws 16 and 20 also flex somewhat so as to allow the jaw faces 36 and 38 to become parallel with increasing locking force and align with the sides of clamped member 79. The flexing of elongated bar 12 and jaws 16 and 20 also permits locking at intervals over one tooth of the track. The torque created by the action of increasing the force on lever 22 toward the fixed jaw assembly 17 causes elongated bar 12 to bow in the region between the jaws 16 and 20. Once the teeth of insert 64 become engaged with the teeth of track 62, and lever 22 moved further towards elongated bar 62, the jaw faces 36 and 38 become flush with the object to which the jaws are being clamped. At the same time pin 84 moves towards the notional plane which passes through the centres of pins 73 and 82. Once pin 84 crosses the notional plane the resistance force provided by the flexed elongated bar 12 and any flexing of the jaws 16 and 20 causes pin 84 to be pressed into a locked position past the notional plane. This prevents lever 22 from springing open. Thus, locking faces 38 and 36 are locked against the aforesaid object. The resiliency of the material forming the faces 36 and 38 prevents scratches and also adds to the locking resistance of the jaws 16 and 20. There is also some flexing of the jaw assemblies 17 and 18 as well which further adds to the locking resistance. Flood light attachment 30 is then pivoted so that it is trained on the desired region.

In the alternative clamping support 10 may be used to clamp adapter plate 42 in jaw engaging region 40. When placed on a floor or other flat support surface, legs 43 rest on the support surface as does the end of elongated bar 12 opposite head assembly 14 so that the flood light attachment 30 is trained at an inclined angle upwardly from near the floor where support 10 rests.

While cable 44 brings electrical power to attachment 30, it might also be used to bring power and communications lines to other types of attachments such as motion detector 50, a camera, a loudspeaker, a satellite dish or the like. Alternatively, batteries might be installed and sensor lines run to the head assembly 14 and through to the service attachment for such things as fire alarms, smoke detectors and the like. In certain applications a hook could be installed in place of attachment 30 to allow the suspension of a variety of objects close at hand to a workmen working at a location elevated from the floor.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. In a clamping device a combination comprising:

(a) an elongate element;

(b) a fixed jaw assembly having a fixed jaw with a fixed jaw face, said fixed jaw assembly being coupled to said elongate element;

(c) a movable jaw assembly having a movable jaw with a movable jaw face and said movable jaw assembly being slidable along said elongated element; and (d) a clamping mechanism coupled to said movable jaw assembly operative to move said movable jaw towards said fixed jaw slightly while said movable jaw assembly is being clamped to said elongate element and said elongate element with inducing means for providing flexibility to allow a slight deflection thereof during clamping and for the deflection force resulting from deflection of said elongate element to maintain a clamping force between said fixed and movable jaw faces.

2. The combination according to claim 1, wherein said fixed and movable jaw faces are inclined so as to define a tapered space therebetween so that regions of said fixed and movable jaw faces furthest removed from said elongate element are closer together than regions thereof closest to said elongate element and upon being tightened against an object therebetween a portion of said elongate element between said fixed and movable jaw assemblies bows so that the region of said jaw faces closest to said elongate element moves towards each other until both jaw faces are flush to opposing surfaces of said object.

3. The combination according to claim 1, wherein said elongate element has a track and said clamping mechanism includes an insert slidable along said track and coupled to said movable jaw assembly, a movable rack positioned in said insert and removably engageable with said track and a lever coupled to said insert and to said movable rack operative to move said movable rack into and out of engagement with said track.

4. The combination according to claim 3, wherein said insert has slots in its side walls and said rack has pins protruding from its sides into corresponding ones of said slots.

5. The combination according to claim 3, wherein said track has a plurality of transverse ribs and a track engaging surface of said movable rack has a plurality of transverse ribs which mate with those of said track.

6. The combination according to claim 1, wherein said jaw faces are made of a resilient material.

7. The clamping support for an attachment, comprising:

(a) an elongated track having a plurality of regularly spaced apart transverse ribs;

(b) a fixed jaw assembly having a fixed jaw with a firxe jaw face, said fixed jaw assembly slidably coupled to said track;

(c) a movable jaw assembly having a movable jaw with a movable jaw face, said movable jaw assembly slidably coupled to said track;

(d) a clamping assembly coupling said movable ajw assembly to said elongated track, said clamping assembly having a lever which, when pivoted, clamps said movable jaw assembly to said elongated track; and (e) means for removably attaching said attachment to the support.

8. The support according to claim 7, including an attachment attached to said support and wherein said means for removably attaching includes a head assembly coupled to said fixed jaw assembly having an attachment receiving means.

9. The support according to claim 7, wherein said clamping means includes a movable rack having a plurality of regularly spaced apart transverse ribs on a track engaging surface thereof which match those of said track, means for guiding movement of said rack into and out of engagement with said track, a lever coupled to said rack operative to move said rack into and out of engagement with said track and an insert enclosing said movable rack, slidable over said track, having flanges extending from side walls thereof and coupled to said movable jaw assembly.

10. The support according to claim 7, including a stand having a pair of legs and a jaw receiving portion so that, when clamped between said fixed jaw face and said movable jaw face, orients said support so its attachment end is above its opposite end.

11. The support according to claim 7, wherein said fixed and movable jaw faces are inclined towards each other slightly in a direction normal to and away from said track and a portion of said elongated track between said jaw assemblies bows towards said jaw faces as said movable jaw is tightened against said fixed jaw assembly and, at the same time, said faces pivot so that portions of said jaw faces not in contact move towards each other.

12. The support according to claim 7, wherein said attachment has a pivot joint and is rotatable when coupled to means for removably attaching.

13. The support according to claim 8, wherein said attachment has an elongated hollow pin threaded at one end said head assembly has a receptacle dimensioned to slidably receive said hollow pin and an interior cavity to permit a nut to threadedly engage threads of said pin and to hold said pin in said receptacle.

14. The support according to claim 8, wherein the attachment is electrically couplable by means of an electrical cable affixed to said head assembly to a remote electrical outlet.

15. The support according to claim 14, including an electrical switch mounted to said head assembly and coupled to said electrical cable for switching power to said service attachment on and off.

16. A support according to claim 7, wherein said jaw faces are made of a resilient material.

17. A support according to claim 8, wherein said attachment is non-electrical.

18. A support according to claim 8, wherein said attachment is a communication device and including communication lines in said head assembly couplable to said attachment.

* * * * *